(12) United States Patent
Drake et al.

(10) Patent No.: US 11,549,588 B2
(45) Date of Patent: Jan. 10, 2023

(54) BRUSH SEAL WITH SLIDING BACKING PLATE

(71) Applicant: United Technologies Corporation, Farmington, CT (US)

(72) Inventors: Jeremy Drake, South Berwick, ME (US); Timothy M. Davis, Kennebunk, ME (US); Mark J. Rogers, Kennebunk, ME (US); Jose R. Paulino, Saco, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 1242 days.

(21) Appl. No.: 15/946,254

(22) Filed: Apr. 5, 2018

(65) Prior Publication Data

US 2019/0309856 A1    Oct. 10, 2019

(51) Int. Cl.
*F16J 15/32* (2016.01)
*F16J 15/3288* (2016.01)
*F01D 11/00* (2006.01)
*F01D 11/08* (2006.01)

(52) U.S. Cl.
CPC .......... *F16J 15/3288* (2013.01); *F01D 11/00* (2013.01); *F01D 11/001* (2013.01); *F01D 11/005* (2013.01); *F01D 11/08* (2013.01); *F05D 2220/323* (2013.01); *F05D 2240/56* (2013.01)

(58) Field of Classification Search
CPC .. F16J 15/3288; F16J 15/3292; F01D 11/005; F01D 11/08; F01D 11/00; F01D 2220/323; F15D 2240/56
See application file for complete search history.

(56) References Cited

U.S. PATENT DOCUMENTS

| 5,074,748 A * | 12/1991 | Hagle | F01D 9/023 415/170.1 |
| 5,351,971 A * | 10/1994 | Short | F16J 15/3288 277/355 |
| 5,480,165 A * | 1/1996 | Flower | F16J 15/3288 277/355 |
| 5,961,280 A | 10/1999 | Turnquist et al. | |
| 6,079,945 A | 6/2000 | Wolfe et al. | |
| 6,173,962 B1 * | 1/2001 | Morrison | F16J 15/3288 277/355 |

(Continued)

OTHER PUBLICATIONS

EP search report for EP19167439.9 dated Sep. 9, 2019.

*Primary Examiner* — Christine M Mills
*Assistant Examiner* — L. Susmitha Koneru
(74) *Attorney, Agent, or Firm* — Getz Balich LLC

(57) ABSTRACT

A brush seal is provided that includes a top plate, a back plate, and a bristle pack. The bristle pack is secured at a joint between the top plate and the back plate. The bristle pack includes a first bristle set extending from the joint, a second bristle set extending from the joint, and a sliding backing plate. The sliding backing plate includes a sliding portion and a support portion. The sliding portion is disposed contiguous with the second bristle set. The support portion has an inner face and a support face. The inner face is in contact with a distal end of the second bristle set. The support face is configured to support at least a portion of the first bristle set. The sliding backing plate is configured to slide relative to the second bristle set.

18 Claims, 9 Drawing Sheets

(56) References Cited

U.S. PATENT DOCUMENTS

| | | | |
|---|---|---|---|
| 6,428,009 B2 * | 8/2002 | Justak | F16J 15/3288 |
| | | | 277/355 |
| 7,021,631 B2 | 4/2006 | Wright et al. | |
| 7,410,173 B2 | 8/2008 | Justak | |
| 8,152,462 B1 * | 4/2012 | Williams | F16J 15/3292 |
| | | | 415/231 |
| 2001/0004145 A1 * | 6/2001 | Wright | F16J 15/441 |
| | | | 277/355 |
| 2003/0201608 A1 * | 10/2003 | Addis | F16J 15/3288 |
| | | | 277/355 |
| 2016/0097294 A1 | 4/2016 | Wilson et al. | |
| 2019/0032786 A1 * | 1/2019 | Davis | F16J 15/3288 |

* cited by examiner

BRUSH SEAL WITH SLIDING BACKING PLATE

BACKGROUND

This disclosure relates generally to seals. More particularly, this disclosure relates to brush seals having a sliding backing plate.

Brush seals include wire bristles that extend across seal cavities between a first component and a second component to reduce airflow through the seal cavity. Brush seals typically include a top plate, a backing plate, and a bristle pack extending from between the top plate and the backing plate and across the seal cavity. The backing plate provides support to the bristles to prevent the bristles from deforming. A backing plate gap is formed in the seal cavity between a distal end of the backing plate and the second component that the bristles extend towards and contact. The portion of the bristles extending across the backing plate gap is unsupported, and as such, the bristles can blow over and deform at high pressures and temperatures. However, a relatively large backing plate gap is required in active seal cavities; i.e., seal cavities where the two components move relative to each other such that the seal cavity expands and contracts during operation, to prevent clashing between the backing plate and the second component. Clashing occurs where the second component contacts the backing plate, and clashing can cause damage to the components defining the seal cavity and to the brush seal. U.S. Pat. Nos. 5,351,971 and 7,021,631 each describe examples of brush seals that are currently known.

What is needed is a brush seal that can adequately seal in a relatively high pressure differential environment and/or one that can withstand relatively high expansion and contraction of the seal cavity and still adequately seal.

SUMMARY

According to an aspect of the present disclosure, a brush seal is provided that includes a top plate, a back plate, a bristle pack, and a sliding back plate. The bristle pack is secured at a joint between the top plate and the back plate. The bristle pack includes a first bristle set extending from the joint, and a second bristle set extending from the joint. The sliding backing plate includes a sliding portion and a support portion. The sliding portion is disposed contiguous with the second bristle set. The support portion has an inner face and a support face, the inner face contacting a distal end of the second bristle set, and the support face configured to support at least a portion of the first bristle set. The sliding backing plate is configured to slide relative to the second bristle set.

According to another aspect of the present disclosure, a seal compartment is provided having a first component, a second component, and a brush seal. The brush seal is configured to provide a seal between the first component and the second component, and is attached to the first component. The brush seal includes a top plate, a back plate, a bristle pack, and a sliding backing plate. The bristle pack is secured at a joint between the top plate and the back plate. The bristle pack includes a first bristle set extending from the joint, and a second bristle set extending from the joint. The sliding backing plate includes a sliding portion and a support portion. The sliding portion is disposed between the second bristle set and the first component. The support portion has an inner face and a support face, the inner face contacting a distal end of the second bristle set, and the support face configured to support at least a portion of the first bristle set. The sliding backing plate is configured to slide relative to the first component.

According to another aspect of the present disclosure, a gas turbine engine is provided that includes a first engine component, a second engine component, a seal cavity extending between the first engine component and the second engine component, and a brush seal secured to the first engine component within the seal cavity. The brush seal includes a top plate, a back plate, a bristle pack, and a sliding backing plate. The bristle pack is secured at a joint between the top plate and the back plate. The bristle pack includes a first bristle set extending from the joint, and a second bristle set extending from the joint. The sliding backing plate includes a sliding portion and a support portion. The sliding portion is disposed between the second bristle set and the first component. The support portion has an inner face and a support face, the inner face contacting a distal end of the second bristle set, and the support face configured to support at least a portion of the first bristle set. The sliding backing plate is configured to slide relative to the first engine component.

In any of the aspects or embodiments described above and herein, the second bristle set may be configured to exert a first pushing force on the inner face of the support portion to outwardly bias the sliding backing plate.

In any of the aspects or embodiments described above and herein, the brush seal may include a chamber defined at least in part by an inner face of the sliding portion and the second bristle set.

In any of the aspects or embodiments described above and herein, the brush seal may include a slide assist configured to exert a second pushing force on the inner face of the sliding portion to outwardly bias the sliding backing plate.

In any of the aspects or embodiments described above and herein, the slide assist may include a spring disposed within the chamber.

In any of the aspects or embodiments described above and herein, the slide assist may include at least one fluid flow passage in flow communication with the chamber, the at least one fluid flow passage configured to provide a pressurized fluid passage to the chamber.

In any of the aspects or embodiments described above and herein, the brush seal may include a support plate secured to the joint and extending between the first bristle set and the second bristle set.

In any of the aspects or embodiments described above and herein, the second bristle set may be configured to exert a first pushing force on the inner face of the support portion to outwardly bias the sliding backing plate toward the second component, and to maintain contact between the sliding backing plate and the second component.

In any of the aspects or embodiments described above and herein, the brush seal portion of the seal compartment may include a chamber defined by an inner face of the sliding portion, the second bristle set, and the first component.

In any of the aspects or embodiments described above and herein, the brush seal portion of the seal compartment may include a slide assist configured to exert a second pushing force on the inner face of the sliding portion to outwardly bias the sliding backing plate toward the second component.

In any of the aspects or embodiments described above and herein, the second bristle set of the brush seal of the gas turbine engine may be configured to exert a first pushing force on the inner face of the support portion to outwardly bias the sliding backing plate toward the second engine component, and to maintain contact between the sliding backing plate and the second engine component.

In any of the aspects or embodiments described above and herein, the brush seal of the gas turbine engine may include a chamber within the seal cavity defined by an inner face of the sliding portion, the second bristle set, and the first engine component.

In any of the aspects or embodiments described above and herein, the brush seal of the gas turbine engine may include a slide assist configured to exert a second pushing force on the inner face of the sliding portion to outwardly bias the sliding backing plate toward the second engine component.

In any of the aspects or embodiments described above and herein, the brush seal of the gas turbine engine may include at least one fluid flow passage in flow communication with the chamber, the at least one fluid flow passage configured to provide a pressurized fluid passage to the chamber.

In any of the aspects or embodiments described above and herein, the first engine component of the gas turbine engine may be a non-rotating component and the second engine component may be a non-rotating component.

In any of the aspects or embodiments described above and herein, the first engine component of the gas turbine engine may be a non-rotating component and the second engine component may be a rotating component.

The foregoing features and the operation of the present disclosure will become more apparent in light of the following description and the accompanying drawings.

DETAILED DESCRIPTION

Figure 1:
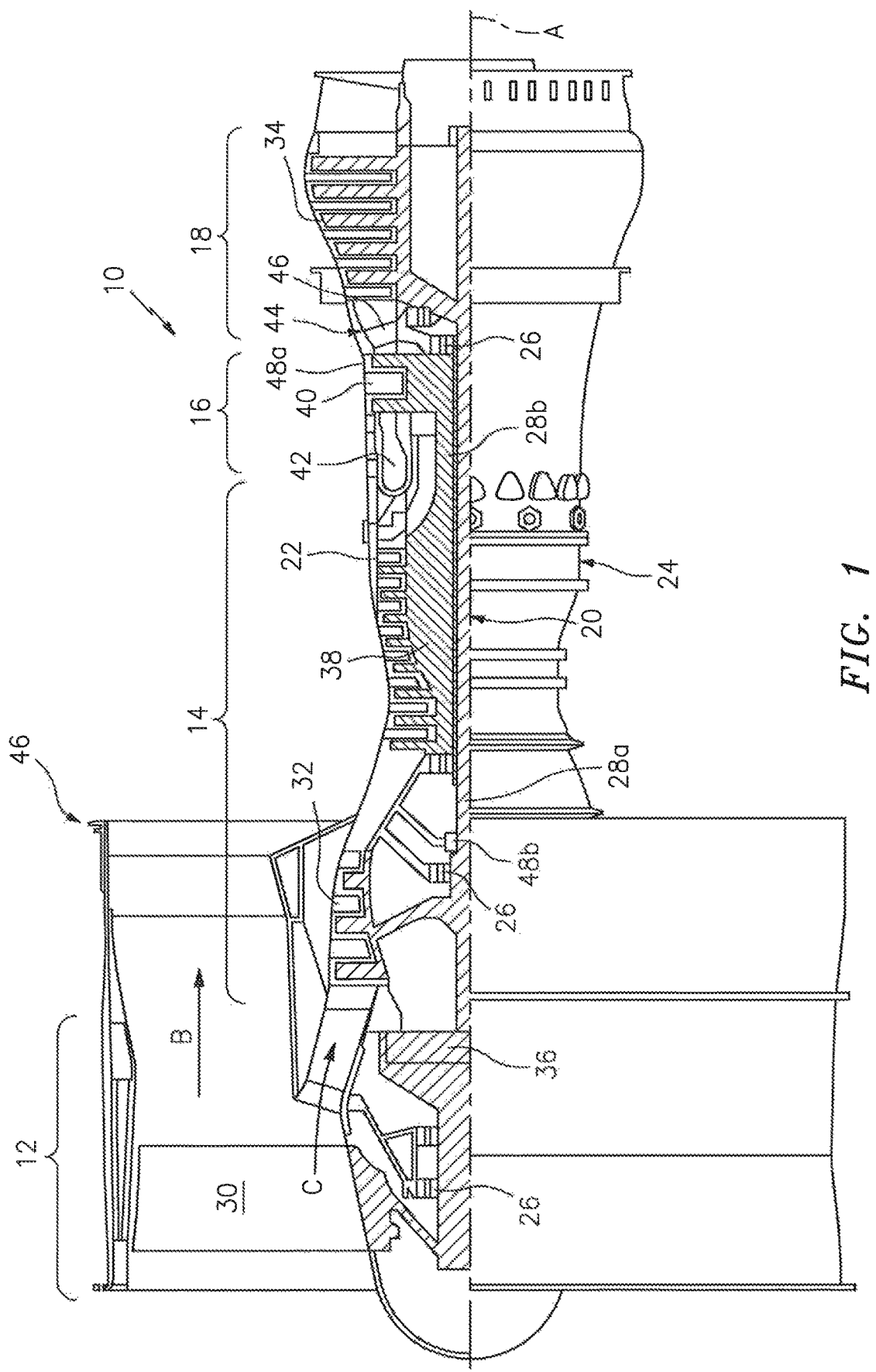
FIG. 1 is a partial cross-sectional view of a gas turbine engine.

FIG. 1 is a quarter-sectional view that schematically illustrates an example gas turbine engine 10 that includes a fan section 12, a compressor section 14, a combustor section 16, and a turbine section 18. Alternative engines might include an augmenter section (not shown) among other systems or features. The fan section 12 drives air along a bypass flowpath B while the compressor section 14 draws air in along core flowpath C, where air is compressed and communicated to combustor section 16. In the combustor section 16, air is mixed with fuel and ignited to generate a high pressure exhaust gas stream that expands through the turbine section 18 where energy is extracted and utilized to drive the fan section 12 and the compressor section 14.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 10 generally includes a low speed spool 20 and a high speed spool 22 mounted for rotation about center axis A of the gas turbine engine 10 relative to an engine static structure 24 via several bearing systems 26. It should be understood that various bearing systems 26 at various locations may alternatively or additionally be provided.

The low speed spool 20 generally includes an inner shaft 28a that connects a fan 30 and a low pressure (or first) compressor section 32 to a low pressure (or first) turbine section 34. The inner shaft 28 drives the fan 30 through a speed change device, such as a geared architecture 36. To drive the fan 30 at a lower speed than the low speed spool 20. The high-speed spool 22 includes an outer shaft 28b that interconnects the high pressure (or second) compressor section 38 and the high pressure (or second) turbine section 40. The inner shaft 28a and the outer shaft 28b are concentric and rotate via bearing systems 26 about center axis A.

The combustor 42 is arranged between the high pressure compressor 38 and the high pressure turbine 40. In one example, the high pressure turbine 40 includes at least two stages to provide a double stage high pressure turbine 40. In another example, high pressure turbine 40 includes only a single stage. As used herein, a "high pressure" compressor or turbine experiences a higher pressure than a corresponding "low pressure" compressor or turbine.

The example low pressure turbine 34 has a pressure ratio that is greater than about five (5). The pressure ratio of the example low pressure turbine 34 is measured prior to an inlet of the low pressure turbine 34 as related to the pressure measured at the outlet of the low pressure turbine 34 prior to an exhaust nozzle.

The mid-turbine frame 44 of the engine static structure 24 can be arranged generally between the high pressure turbine 40 and the low pressure turbine 34. The mid-turbine frame 44 further supports bearing systems 26 in the turbine section 18 as well as setting airflow entering the low pressure turbine 34.

The gas flow in core flowpath C is compressed first by the low pressure compressor 32 and then by the high pressure compressor 38. The now compressed gas flow is mixed with fuel and ignited in the combustor 42 to produce high speed exhaust gases. The high speed exhaust gasses are then expanded through the high pressure turbine 40 and the low pressure turbine 34. The mid-turbine frame 44 includes vanes 46, which are in the core flowpath and function as an inlet guide vane for the low pressure turbine 34. Utilizing the vanes 46 of the mid-turbine frame 44 as the inlet guide vane for low pressure turbine 34 decreases the axial length of the low pressure turbine 34 without increasing the axial length of the mid-turbine frame 44. Reducing or eliminating the number of vanes in the low pressure turbine 34 shortens the axial length of turbine section 18. Thus, the compactness of the gas turbine engine 10 is increased and a higher power density may be achieved.

The disclosed gas turbine engine 10 in one example is a high-bypass geared aircraft engine. In a further example, the gas turbine engine 10 includes a bypass ratio greater than about six (6), with an example embodiment being greater than about ten (10). The example geared architecture 36 is an epicyclical gear train, such as a planetary gear system, star gear system, or other known gear system, with a gear reduction ratio of greater than about 2.3.

In one disclosed embodiment, the gas turbine engine 10 includes a bypass ratio greater than about ten (10:1) and the fan diameter is significantly larger than an outer diameter of low pressure compressor 32. It should be understood, however, that the above parameters are exemplary of one embodiment of a gas turbine engine including a geared architecture and that the present disclosure is applicable to other gas turbine engines.

Brush seals 48 are disposed between components within the gas turbine engine 10 to substantially prevent gas flow from leaking between the components. In some examples, a brush seal 48a can be disposed between relatively static components. For example, a brush seal 48a can be disposed between a vane endwall and a blade outer air seal. In some examples, a brush seal 48b can be disposed between relatively rotating components. For example, a brush seal 48b can be disposed between a static structure of gas turbine engine 10 and one of inner shaft 28a and outer shaft 28b.

Figure 2:
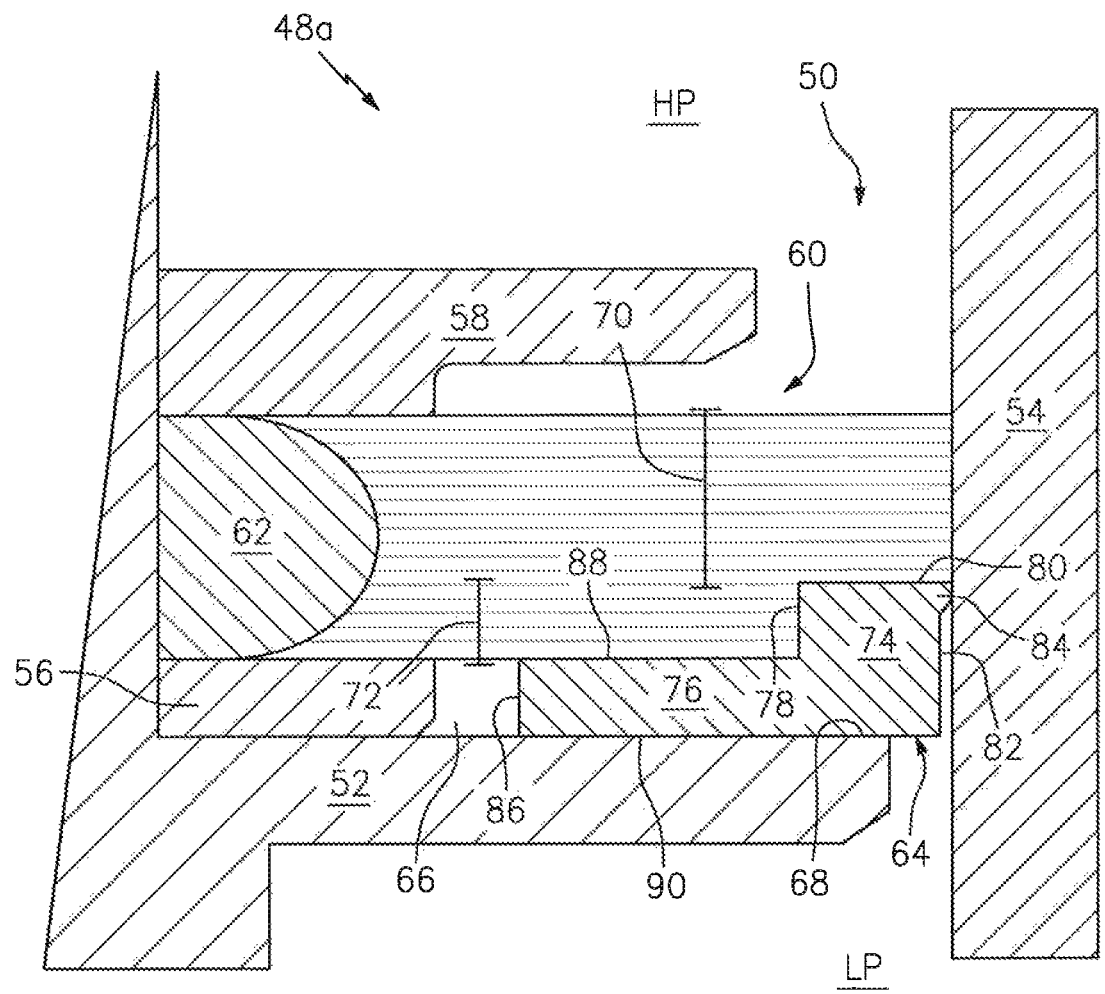
FIG. 2 is a cross-sectional view of an embodiment of a brush seal.

FIG. 2 is a cross-sectional view of brush seal 48a. Brush seal 48a is disposed in seal cavity 50 between first component 52 and second component 54 and is configured to prevent leakage of air or other gas through seal cavity 50. Brush seal 48a includes back plate 56, top plate 58, bristle pack 60, joint 62, sliding backing plate (SBP) 64, and chamber 66. The first component 52 includes a support surface 68. The bristle pack 60 includes first bristle set 70 and second bristle set 72. The SBP 64 includes a support portion 74 and a sliding portion 76. The support portion 74 includes a first inner face 78, a support face 80, and a contact face 82. In some embodiments, the contact face 82 may include a bulge 84 (e.g., a raised portion of the surface). The sliding portion 76 includes a second inner face 86, a bristle-side face 88, and a component-side face 90.

The brush seal 48a extends circumferentially around center axis A (shown in FIG. 1). The bristle pack 60 is secured at the joint 62 between the top plate 58 and back plate 56. The sliding portion 76 of the SBP 64 is disposed between bristle pack 60 and the support surface 68 of the first component 52. The support portion 74 of the SBP 64 extends across the seal cavity 50 and is configured to support a portion of the first bristle set 70 extending into the seal cavity 50. The component-side face 90 of the SBP 64 is in contact with the support surface 68 of the first component 52, and the SBP 64 is configured to slide relative to first component 52. The chamber 66 is disposed adjacent the second inner face 86 between the first component support surface 68 and the second bristle set 72, and the chamber 66 receives the sliding portion 76 to allow the SBP 64 to slide to the left (when viewed from the perspective of FIG. 1) in response to the seal cavity 50 contracting. The support portion 74 of the SBP 64 extends from the sliding portion 76 of the SBP 64. The contact face 82 of the SBP 64 is configured to maintain contact with the second component 54 during operation of the gas turbine engine 10 (shown in FIG. 1). In those embodiments that include a bulge 84, the bulge 84 can extend from the contact face 82 towards the second component 54 and can contact the second component 54. It is understood, however, that any portion of the contact face 82 can maintain contact with the second component 54. The first component 52 and the second component 54 can be relatively stationary components (e.g., vanes and blade outer air seals), or one component may rotate relative to the other component. The seal cavity 50 as shown in FIG. 2, is an axial gap between the first component 52 and the second component 54 that extends circumferentially about center axis A. It is understood that the seal cavity 50 can be an axial gap between the first component 52 and the second component 54, a radial gap between the first component 52 and the second component 54, or a combination thereof, such that the seal cavity 50 extends both radially and axially. In any orientation, the seal cavity 50 can extend circumferentially about center axis A.

The second bristle set 72 extends from the joint 62 towards the second component 54. The second bristle set 72 extends over the bristle-side face 88 of the SBP 64 and a distal end of the second bristle set 72 contacts the first inner face 78 of support portion 74. The second bristle set 72 is configured to exert a pushing force (e.g., a biasing force) on the first inner face 78, such that the second bristle set 72 pushes the SBP 64 into contact with the second component 54. The first bristle set 70 extends from the joint 62 across seal cavity 50 towards the second component 54. A distal end of the first bristle set 70 is configured to contact the second component 54 (or be disposed in very close proximity) such that first bristle set 70 substantially prevents air or other gas from leaking through seal cavity 50. At least a portion of the first bristle set 70 is contiguous with the support portion 74 of the SBP 64 and is disposed contiguous with the support face 80 of the support portion 74. The support portion 74 of SBP 64 provides support to the first bristle set 70, thereby preventing the first bristle set 70 from blowing over or otherwise displacing due to high pressure differentials and/or temperatures. The first bristle set 70 and the second bristle set 72 can be formed from a variety of different materials (e.g., a cobalt alloy, etc.) that can withstand the temperatures present in the high pressure turbine section 40 (shown in FIG. 1) during engine operation. In addition, the second bristle set 72 can include a series of bristle groups circumferentially spaced from one another to facilitate the sliding of SBP 64 (discussed in more detail in FIG. 9).

A high-pressure region HP is disposed on a first side of the seal cavity 50, and a low-pressure region LP is disposed on a second side of the seal cavity 50. The first bristle set 70 extends across the seal cavity 50 to at least substantially impede or to prevent air and other gases from flowing from the high-pressure region HP to the low-pressure region LP through the seal cavity 50. The SBP 64 is configured to slide on the support surface 68 of the first component 52 such that contact face 82 (or the bulge 84 in those embodiments that include a bulge 84) maintains contact with the second component 54 throughout operation. To maintain the contact face 82 on the second component 54, the second bristle set 72 exerts a pushing force (e.g., a biasing force) on the first inner face 78, thereby driving the SBP 64 towards the second component 54 such that the contact face 82 contacts the second component 54. In some examples, the second bristle set 72 may be angled in the circumferential direction around the center axis A (shown in FIG. 1), such that the pushing force is generated by the bristles of second bristle set 72 attempting to return to a more axial orientation.

During operation, the first component 52 and the second component 54 can move relative to each other such that the seal cavity 50 actively expands and contracts. As the seal cavity 50 expands, the pushing force generated by the second bristle set 72 on the first inner face 78 causes the SBP 64 to slide across seal cavity 50 such that the contact face 82 maintains contact with the second component 54. As such, the support face 80 continues to support the first bristle set 70 such that there is little to no unsupported length of the first bristle set 70. As the seal cavity 50 contracts, the second component 54 causes the SBP 64 to slide in the opposite direction; i.e., toward the back plate 56. The chamber 66 can receive at least an amount of the sliding portion 76 of the SBP 64 when the seal cavity 50 contracts. The chamber 66 can be of any desired size for receiving sliding portion 76. In some examples, chamber 66 can be equal to or greater than a difference between a width of a fully expanded seal cavity 50 and a width of a fully contracted seal cavity 50. The chamber 66 allowing the SBP 64 to continue retracting into the chamber 66 as the seal cavity 50 contracts, prevents potential clash between the second component 54 and a hard stop of the brush seal 48, such as the front plate 58. In all designed operating conditions, the SBP 64 does not present any hard stop against which the second component 54 can clash. By maintaining contact with the second component 54, the SBP 64 minimizes any unsupported length of the first bristle set 70 within the seal cavity 50, thereby mitigating any potential of the first bristle set 70 blowing over due to high temperatures and/or pressures.

In some examples, the SBP 64 is formed from a lubricious material to reduce friction between the SBP 64 and the contact surface 68 of the first component 52. For example, the SBP 64 may comprise a cobalt material or a cobalt-based alloy material. In some examples, the SBP 64 can include a lubricious coating configured to reduce friction resisting movement of the SBP 64. For example, a coating can be applied to the component-side face 90 of the SBP 64, to the support surface 68 of the first component 52, or to both, to thereby reduce axial friction between the SBP 64 and the first component 52. In a further example, a coating can be applied to the bristle-side face 88 of the SBP 64 to reduce axial friction between the SBP 64 and the second bristle set 72. The SBP 64 can include any suitable coating for reducing the coefficient of friction of the SBP 64.

The brush seal 48a embodiment described above and shown in FIG. 2 may provide significant advantages. The SBP 64 maintains contact with the second component 54 and slides on the first component 52 as the seal cavity 50 expands and contracts. By sliding relative to the first component 52 such that the contact face 82 maintains contact with the second component 54 as the seal cavity expands and contracts, the SBP 64 minimizes any unsupported length of the first bristle set 70 within the seal cavity 50. Minimizing the unsupported length of the first bristle set 70 increases the ability of the brush seal 48a to operate in high temperature, high pressure-differential environments and within active seal cavities. The aforesaid brush seal 48a embodiment also provides improved sealing. By minimizing the unsupported length of the first bristle set 70, the bristles in the first bristle set 70 can have a smaller diameter than might be possible otherwise, which smaller diameter provides improved flexibility and reduces any leakage through the first bristle set 70. Furthermore, the SBP 64 may prevent clash between the second component 54 and the brush seal 48a, as the SBP 64 slides in response to the seal cavity 50 contracting, thereby preventing damage to both the brush seal 48a and the second component 54.

Figure 3:
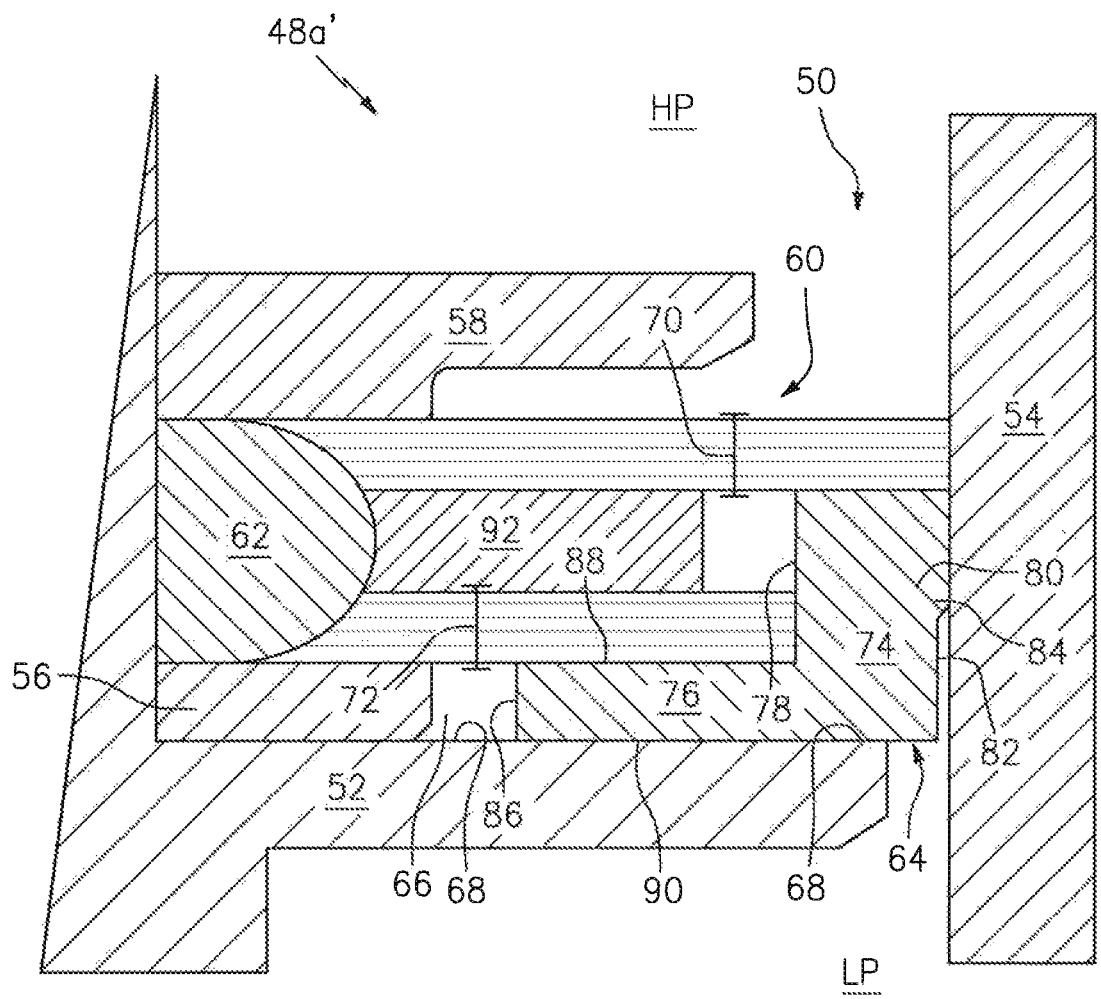
FIG. 3 is a cross-sectional view of a first alternate embodiment of a brush seal.

FIG. 3 is a cross-sectional view of a brush seal 48a' embodiment. The brush seal 48a' is disposed in a seal cavity 50 disposed between a first component 52 and a second component 54. The brush seal 48a' includes a back plate 56, a top plate 58, a bristle pack 60, a joint 62, a sliding backing plate (SBP) 64, a chamber 66, and a support plate 92. The first component 52 includes a support surface 68. The bristle pack 60 includes a first bristle set 70 and a second bristle set 72. The SBP 64 includes a support portion 74 and a sliding portion 76. The support portion 74 includes a first inner face 78, a support face 80, and a contact face 82. In some embodiments, the contact face 82 may include a bulge 84 (e.g., a raised portion of the surface). The sliding portion 76 includes a second inner face 86, a bristle-side face 88, and a component-side face 90.

The brush seal 48a' extends circumferentially around center axis A (shown in FIG. 1) and is configured to substantially impede or prevent leakage of air and other gas through the seal cavity 50. The bristle pack 60 is secured between a top plate 58 and a back plate 56 and extends from the joint 62 towards the second component 54. The SBP 64 is disposed between the bristle pack 60 and the support surface 68 of the first component 52 and is configured to slide relative to the first component 52. The first bristle set 70 extends from the joint 62, across the seal cavity 50, and contacts the second component 54. The support face 80 of the SBP 64 provides support to the first bristle set 70 to mitigate the possibility of the first bristle set 70 deforming and blowing over as a result of high pressure differentials between the high pressure region HP and the low pressure region LP and/or due to high temperatures. The second bristle set 72 extends over the bristle-side face 88 of the SBP 64 and contacts the first inner face 78 of the SBP 64. The second bristle set 72 exerts a pushing force (e.g., a biasing force) on the first inner face 78 to drive the SBP 64 towards the second component 54 and to maintain contact between the contact face 82 and the second component 54. The support plate 92 extends from the joint 62 and is disposed between the first bristle set 70 and the second bristle set 72. The support plate 92 extends circumferentially around center axis A (shown in FIG. 1). The support plate 92 can be secured between the first bristle set 70 and the second bristle set 72 in any suitable manner, such as by welding or clamping.

During operation, the support plate 92 provides radial support for a portion of the first bristle set 70 extending over the support plate 92, thereby reducing the radial load experienced by the second bristle set 72. The fluid disposed in high-pressure region HP exerts a force on the first bristle set 70. In the absence of the support plate 91, the force could be transferred to the second bristle set 72 and thus to the SBP 64, thereby increasing the friction between the SBP 64 and first component 52. The support plate 92 reduces the load transferred to the second bristle set 72, and thus to the SBP 64, by transferring the load to the joint 62 instead of the second bristle set 72. By reducing the load on the SBP 64, the support plate 92 also reduces the friction between the second bristle set 72 and the bristle-side face 88 and between the component-side face 90 and the support surface 68 of the first component 52. With reduced friction, less force is required to drive the SBP 64 into contact with the second component 54. As such, the bristles of the second bristle set 72 can have a smaller diameter than would be possible otherwise, while still ensuring that the SBP 64 remains in contact with the second component 54. The smaller diameter of the second bristle set 72 allows the second bristle set 72 to tolerate greater deflection between the first component 52 and the second component 54, such as the deflection caused by a more active seal cavity, such as seal cavity 50, without yielding and/or deforming. The support plate 92 can be formed from any suitable material that can be formed into a flat annular plate and that is able to withstand high temperatures during engine operation. For example, the support plate 92 may be made from a nickel-based alloy, a hardenable nickel-based alloy, a cobalt-based alloy, or any other suitable material.

The brush seal 48a' embodiment described above and shown in FIG. 3, may provide significant advantages. The support plate 92 reduces radial loading on the SBP 64, thereby reducing the friction acting against the SBP 64. As such, less force is required to drive the SBP 64 into contact with the second component 54. The second bristle set 72 can thus have bristles with a smaller diameter and less stiffness, thereby reducing the manufacturing costs associated with the brush seal 48a'. Moreover, reducing the friction acting on the SBP 64 reduces wear, thereby increasing the useful life of the brush seal 48a'. In addition, the first bristle set 70 can also include smaller diameter bristles to provide improved sealing because the SBP 64 supports the first bristle set 70. As such, fewer bristles are required to provide similar sealing efficiency, such that the brush seal 48a' can have a reduced size due to the reduced size and number of bristles.

Figure 4:
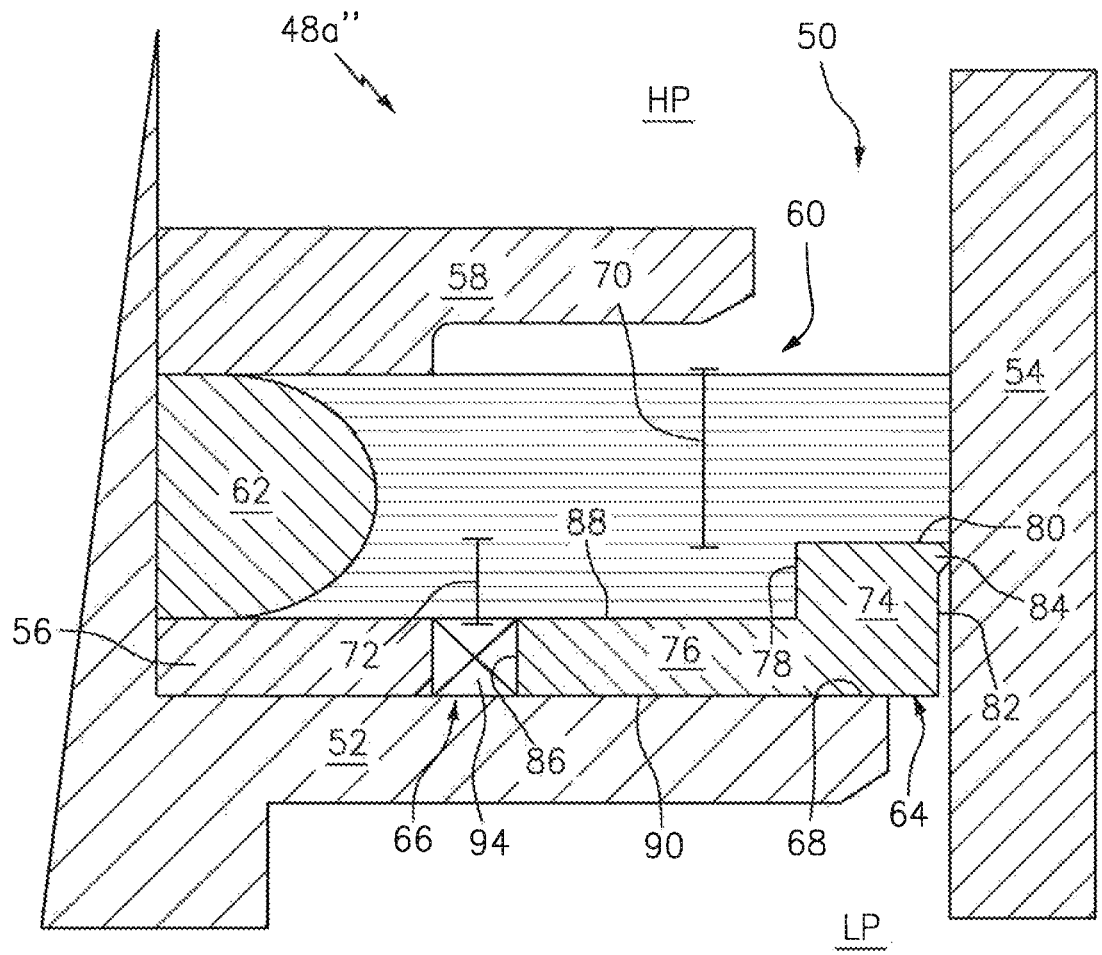
FIG. 4 is a cross-sectional view of a second alternate embodiment of a brush seal.

FIG. 4 is a cross-sectional view of an embodiment of a brush seal 48a". The brush seal 48a" is disposed in a seal cavity 50 between a first component 52 and a second component 54. The brush seal 48a" includes a back plate 56, a top plate 58, a bristle pack 60, a joint 62, a sliding backing plate (SBP) 64, a chamber 66, and a slide assist 94. The first component 52 includes a support surface 68. The bristle pack 60 includes a first bristle set 70 and a second bristle set 72. The SBP 64 includes a support portion 74 and a sliding portion 76. The support portion 74 includes a first inner face 78, a support face 80, and a contact face 82. In some embodiments, the contact face 82 may include a bulge 84 (e.g., a raised portion of the surface). The sliding portion 76 includes a second inner face 86, a bristle-side face 88, and a component-side face 90.

The brush seal 48e extends circumferentially around center axis A (shown in FIG. 1) and is configured to at least substantially impede or prevent leakage of air and other gas through the seal cavity 50. The bristle pack 60 is secured between the top plate 58 and the back plate 56 and extends from the joint 62 towards the second component 54. The SBP 64 is disposed between the bristle pack 60 and the first component 52 and is configured to slide relative to the first component 52. The first bristle set 70 extends from the joint 62, across the seal cavity 50, and contacts the second component 54. The support face 80 of the SBP 64 provides support to the first bristle set 70 to mitigate the possibility of the first bristle set 70 deforming and blowing over as a result of high pressure differentials between the high pressure region HP and the low pressure region LP and/or due to high temperatures. The second bristle set 72 extends over the bristle-side face 88 of the SBP 64 and contacts the first inner face 78 of the SBP 64. The second bristle set 72 exerts a first pushing force (e.g., biasing force) on the first inner face 78 to drive the SBP 64 towards the second component 54 and to maintain contact between the contact face 82 (or bulge 84 in those embodiments that include a bulge 84) and the second component 54. The slide assist 94 is disposed in the chamber 66 adjacent the second inner face 86. The slide assist 94 is configured to exert a second pushing force on the second inner face 86 of the SBP 64, to drive the SBP 64 across the seal cavity 50 such that the contact face 82 contacts the second component 54. In some examples, the slide assist 94 can be mechanical and can be of any suitable configuration for generating the second pushing force (e.g., biasing force). For example, the slide assist 94 can be a spring, such as a wave spring, disposed in chamber 66.

During operation, the first component 52 and the second component 54 can move relative to each other such that the seal cavity 50 expands and contracts. The second bristle set 72 is configured to exert the first pushing force on the first inner face 78 to drive the SBP 64 towards the second component and to maintain contact between the contact face 82 (or bulge 84 portion thereof) and the second component 54. The slide assist 94 exerts the second pushing force on the second inner face 86 of the SBP 64 to force the SBP 64 towards the second component 54. The first pushing force and the second pushing force act together to drive the SBP 64 towards the second component 54 and maintain contact between the contact face 82 and the second component 54. Maintaining the contact face 82 in contact with the second component 54 minimizes any unsupported length of the first bristle set 70, as the support face 80 provides support for the first bristle set 70. The SBP 64 thus extends across the seal cavity 50 and supports the length of the first bristle set 70, thereby mitigating the potential for the first bristle set 70 from blowing over or deforming.

While the brush seal 48a" is described as including a mechanical slide assist 94, it is understood that the brush seal 48a" can include any desired number and configuration of slide assists 94 to maintain the SBP 64 in contact with the second component 54. For example, the brush seal 48a" can include both a mechanical slide assist, such as a spring, and a pneumatic slide assist, such as the slide assist 94' (discussed in more detail in FIG. 5). In another example, the brush seal 48a" can include the mechanical slide assist and a support plate, such as support plate 92 (e.g., see FIG. 3). In yet another example, the brush seal 48a" can include the mechanical slide assist, the pneumatic slide assist, and the support plate. It is thus understood that the brush seal 48a" can include any desired number and arrangement of slide assists 94 to generate the second pushing force. In a further example, brush seal 48a" can include a single bristle set and slide assist 94. For example, the first bristle set 70 can extend across seal cavity 50 to provide sealing, and the SBP 64 can support a full extent of the first bristle set 70. The slide assist 94 can then provide the full pushing force required to drive the SBP 64 into contact with the second component 54.

The brush seal 48a" embodiment described above and shown in FIG. 4 may provide significant advantages. The slide assist 94 provides additional three to push the SBP 64 into the seal cavity 50 and overcome the friction between the SBP 64 and the second bristle set 72 and between the SBP 64 and the first component 52. As such, the second bristle set 72 requires less stiffness to drive the SBP 64, thereby reducing the manufacturing costs associated with the brush seal 48a". Moreover, the brush seal 48a" can also include fewer bristles in the second bristle set 72 to generate the same overall pushing force (e.g., biasing force), due to the second pushing force from the slide assist 94, thereby reducing manufacturing costs, and the bristles of the second bristle set 72 can include a reduced diameter. The reduced diameter of the second bristle set 72 may allow the second bristle set 72 to tolerate greater deflection between the first component 52 and the second component 54, such as the deflection caused by a more active seal cavity, such as seal cavity 50, without yielding and/or deforming.

Figure 5:
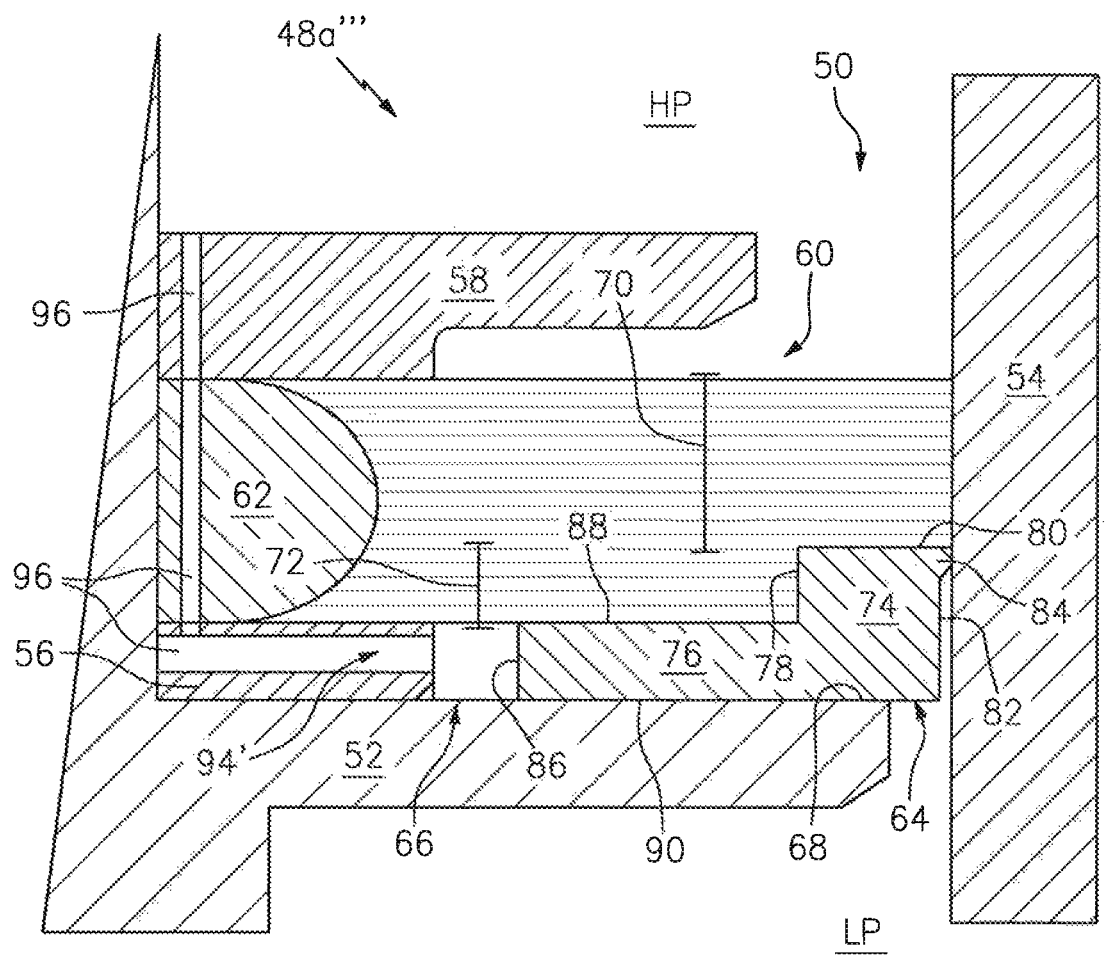
FIG. 5 is a cross-sectional view of a third alternate embodiment of a brush seal.

FIG. 5 is a cross-sectional view of an embodiment of a brush seal 48a'". Brush seal 48a'" is disposed in a seal cavity 50 between a first component 52 and a second component 54 and extends circumferentially about a center axis A (shown in FIG. 1). The brush seal 48a''' includes a back plate 56, a top plate 58, a bristle pack 60, a sliding backing plate (SBP) 64, a chamber 66, and a slide assist 94'. The first component 52 includes a support surface 68. The bristle pack 60 includes a first bristle set 70 and a second bristle set 72. The SBP 64 includes a support portion 74 and a sliding portion 76. The support portion 74 includes a first inner face 78, a support face 80, and a contact face 82. In some embodiments, the contact face 82 may include a bulge 84 (e.g., a raised portion of the surface). The sliding portion 76 includes a second inner face 86, a bristle-side face 88, and a component-side face 90.

The brush seal 48a''' extends circumferentially around the center axis A (shown in FIG. 1) and is configured to substantially impede or prevent leakage of air and other gas through the seal cavity 50. The bristle pack 60 is secured between the top plate 58 and the back plate 56 and extends from a joint 62 towards the second component 54. The SBP 64 is disposed between bristle pack 60 and the support surface 68 of the first component 52 and is configured to slide relative to first component 52. The first bristle set 70 extends from the joint 62, across the seal cavity 50, and contacts the second component 54. The support face 80 of the SBP 64 provides support to the first bristle set 70 to mitigate the possibility of the first bristle set 70 deforming and blowing over as a result of high pressure differentials between high pressure region HP and low pressure region LP and/or due to high temperatures. The second bristle set 72 extends over the bristle-side face 88 of the SBP 64 and contacts the first inner face 78 of the SBP 64. The second bristle set 72 exerts a first pushing force (e.g., a biasing force) on the first inner face 78 to drive the SBP 64 towards the second component 54 and to maintain contact between the contact face 82 and the second component 54.

The slide assist 94' is configured to exert a second pushing force on the SBP 64 to drive the SBP 64 into contact with the second component 54. The chamber 66 is disposed adjacent the second inner face 86 of the SBP 64. The flow passages 96 extend though the brush seal 48a''' and are in flow communication with the chamber 66. The flow passages 96 are configured to provide a pressurized fluid, such as air from the high-pressure region HP, to the chamber 66. In some examples, the flow passages 96 can be channels integral with and extending through brush seal 48a'''. In some examples, the brush seal 48a''' may be spaced from the first component 52 such that a radial portion of the flow passages 96 is formed between the brush seal 48a''' and the first component 52, and an axial portion of the flow passages 96 extends through the brush seal 48a''' to fluidly connect the radial portion and the chamber 66. For example, the flow passages 96 can include a plurality of individual bores through the brush seal 48a''' in some examples, the vertical portion of the flow passages 96 can include a slot configured to supply pressurized fluid to multiple bores of the horizontal portion. It is understood, however, that the flow passages 96 may be of any suitable form for supplying the pressurized fluid to the chamber 66. The pressurized fluid provided to the chamber 66 through the flow passages 96 generates the second pushing force on the second inner face 86 of the SBP 64 to push the SBP 64 towards the second component 54.

During operation, the first component 52 and the second component 54 can move relative to each other such that the seal cavity 50 expands and contracts. The second bristle set 72 is configured to generate the first pushing force on the first inner face 78 of the support portion 74 to push the SBP 64 towards the second component 54. The slide assist 94' is configured to pneumatically generate the second pushing force in the chamber 66 such that the second pushing force acts on the second inner face 86 of the SBP 64 to drive the SBP 64 towards the second component 54. The first pushing force and the second pushing force combine to drive the SBP 64 towards the second component 54, thereby maintaining contact between the contact face 82 (or bulge 84 portion thereof) and the second component 54 and minimizing any unsupported length of the first bristle set 70.

While the brush seal 48a''' is described as including the slide assist 94', it is understood that the brush seal 48a''' can include any desired configuration and number of the slide assists 94' to drive the SBP 64 across the seal cavity 50 and to maintain the contact face 82 in contact with the second component 54. For example, the brush seal 48a''' can include both a mechanical slide assist 94 as described above (e.g., see FIG. 4), and a pneumatic slide assist 94' (e.g., see FIG. 5). For example, the brush seal 48a''' can include flow passages 96 for conveying high pressure air to the chamber 66 and can include a spring disposed in the chamber 66. In another example, the brush seal 48a''' can include the pneumatic slide assist and a support plate, such as support plate 92 (e.g., see FIG. 3). In yet another example, the brush seal 48a''' can include the mechanical slide assist, the pneumatic slide assist, and the support plate. It is thus understood that the brush seal 48a''' can include any desired number and arrangement of slide assists 94. In a further example, the brush seal 48a'' can include a single bristle set and the slide assist 94'. For example, the first bristle set 70 can extend across the seal cavity 50 to provide sealing, and the SBP 64 can support a full extent of the first bristle set 70. The slide assist 94' can then provide the full pushing force required to drive the SBP 64 into contact with the second component 54.

The brush seal 48a''' embodiment described above and shown in FIG. 5, may provide significant advantages. The pressurized fluid in the chamber 66 provides additional force to overcome the friction between the SBP 64 and the second bristle set 72 and between the SBP 64 and the support surface 68 of the first component 52. As such, the second bristle set 72 requires less stiffness to drive the SBP 64, thereby reducing the manufacturing costs associated with the brush seal 48a''. Moreover, the brush seal 48a''' can also include fewer bristles in the second bristle set 72 to generate the same overall pushing force, due to the second pushing force from the slide assist 94', thereby reducing manufacturing costs. Furthermore, the slide assist 94' being pneumatic allows the slide assist 94' to provide additional pushing force without any additional mechanical components, thereby reducing cost and simplifying manufacturing.

Figure 6:
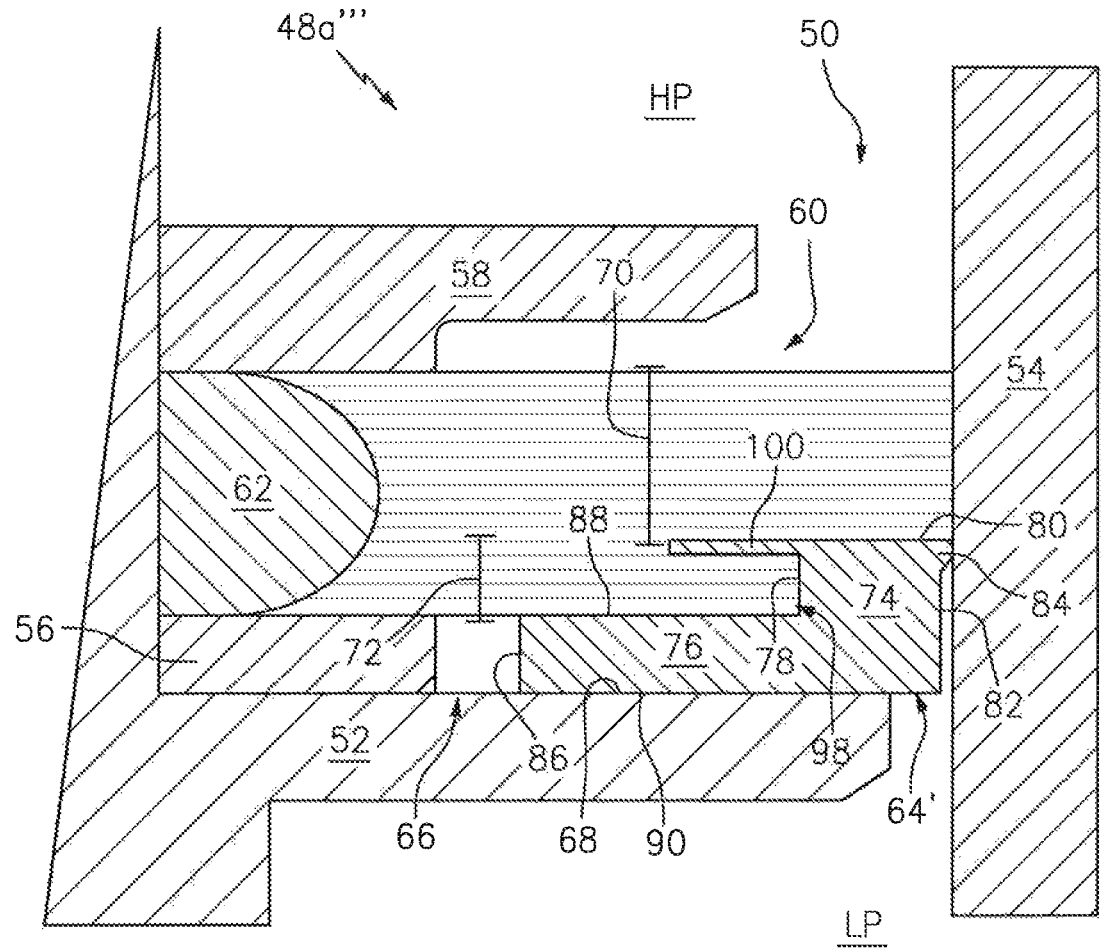
FIG. 6 is a cross-sectional view of a fourth alternate embodiment of a brush seal.

FIG. 6 is a cross-sectional view of a brush seal 48a'' embodiment. The brush seal 48a''' is disposed in a seal cavity 50 between a first component 52 and a second component 54. The brush seal 48a''' includes a back plate 56, a top plate 58, a bristle pack 60, a joint 62, a SBP 64', and a chamber 66. The first component 52 includes a support surface 68. The bristle pack 60 includes a first bristle set 70 and a second bristle set 72. The SBP 64' includes a support portion 74, a sliding portion 76, and a slot 98. The support portion 74 includes a first inner face 78, s support face 80, a contact face 82, and an upper land 100. In some embodiments, the contact face 82 may include a bulge 84. The sliding portion 76 includes a second inner face 86, a bristle-side face 88, and a component-side face 90.

The brush seal 48a''' extends circumferentially around the center axis A (shown in FIG. 1) and is configured to substantially mitigate or prevent leakage of air and other gas through the seal cavity 50. The bristle pack 60 is secured between the top plate 58 and the back plate 56 and extends from the joint 62 towards the second component 54. The SBP 64' is disposed between the bristle pack 60 and support surface 68 of the first component 52 and is configured to slide relative to first component 52 such that the contact face 82 maintains contact with the second component 54 during operation. The first bristle set 70 extends over the support face 80 of the SBP 64' into the seal cavity 50, and is configured to contact the second component 54 to substantially impede or prevent air and other gases from leaking through the seal cavity 50. The support face 80 of the SBP 64' provides support to the first bristle set 70, thereby mitigating the potential of the first bristle set 70 deforming and blowing over due to high pressure differentials and temperatures. The second bristle set 72 extends over the bristle-side face 88 of the SBP 64' and contacts the first inner face 78 of the SBP 64'. The upper land 100 extends from the first inner face 78 of the support portion 74. The upper land 100 extends between the first bristle set 70 and the second bristle set 72. The slot 98 is disposed between the upper land 100 and the bristle-side face 88, and is configured to receive a distal portion of second bristle set 72. The upper land 100 separates the first bristle set 70 and the second bristle set 72, and as such the upper land 100 mitigates the potential for entanglement between the first bristle set 70 and the second bristle set 72. The upper land 100 allows a longer bristle length in the second bristle set 72 and allows for a longer length of the support face 80, thereby providing additional support to the first bristle set 70.

The SBP 64' embodiment described above and shown in FIG. 6 may provide significant advantages. During operation, the first component 52 and the second component 54 can move relative to each other such that the seal cavity 50 expands and contracts. The second bristle set 72 exerts a force (e.g., a biasing force) on the first inner face 78 to push the SBP 64' towards the second component 54, thereby minimizing any unsupported length of the first bristle set 70. The upper land 100 prevents the first bristle set 70 and the second bristle set 72 from becoming entangled as the SBP 64' shifts within the seal cavity 50, and reducing entanglement increases the lifespan of brush seal 48a'''.

Figure 7:
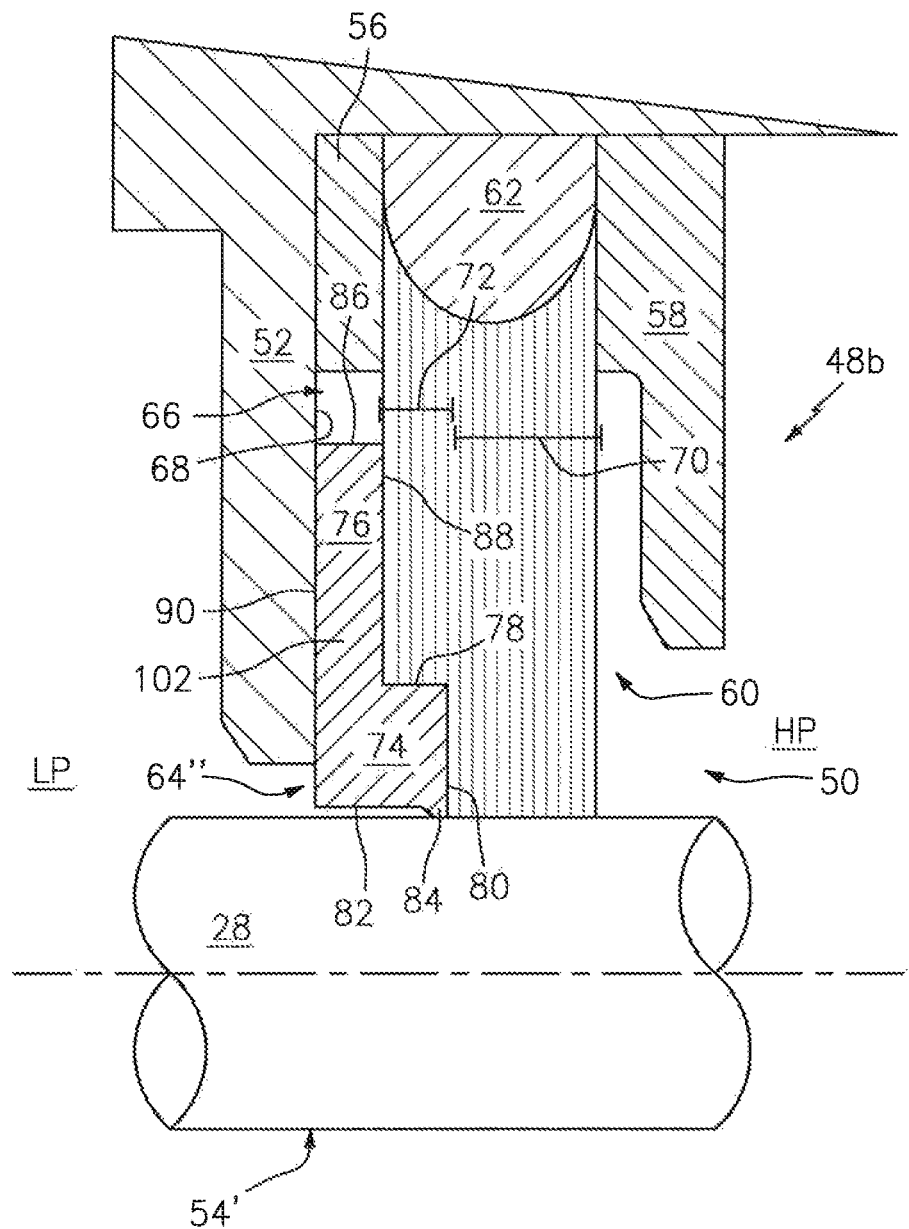
FIG. 7 is a cross-sectional view of an embodiment of a brush seal.

FIG. 7 is a cross-sectional view of an embodiment of a brush seal 48b. The brush seal 48b is circumferentially disposed in a seal cavity 50 between a first component 52 and a second component 54'. The second component 54' is configured to rotate relative to the first component 52. In some examples, the second component 54' can be a rotating shaft, such as shaft 28a (FIG. 1) and shaft 28b (FIG. 1). The brush seal 48b includes a back plate 56, a top plate 58, a bristle pack 60, a joint 62, a SBP 64', and a chamber 66. The first component 52 includes a support surface 68. The bristle pack 60 includes a first bristle set 70 and a second bristle set 72. The SBP 64" includes SBP segments 102. Each SBP segment 102 includes a support portion 74 and a sliding portion 76. The support portion 74 includes a first inner face 78, a support face 80, and a contact face 82. In some embodiments, the contact face 82 may include a bulge 84 (e.g., a raised portion of the surface). The sliding portion 76 includes a second inner face 86, a bristle-side face 88, and a component-side face 90.

The brush seal 48b extends circumferentially around the center axis A (shown in FIG. 1) and is configured to substantially impede or prevent leakage of air and other gas through the seal cavity 50. The bristle pack 60 is secured between the top plate 58 and the back plate 56 and extends from the joint 62 towards the second component 54'. The SBP 64" is disposed between the bristle pack 60 and the back plate 56 and is configured to slide relative to the back plate 56 such that the contact face 82 maintains contact with or close proximity to the shaft 28 during operation, thereby ensuring support for the first bristle set 70. The first bristle set 70 extends from the joint 62, across the seal cavity 50, and contacts the second component 54'. The support face 80 provides support to the first bristle set 70 to mitigate the potential of the first bristle set 70 deforming and blowing over due to high pressure differentials between high pressure region HP and low pressure region LP and/or due to high temperatures. The second bristle set 72 extends over the bristle-side face 88 and contacts the first inner face 78 of the SBP 64". The second bristle set 72 exerts a pushing force (e.g., a biasing force) on the first inner face 78 to drive the SBP segment 102 towards the second component 54' and to maintain contact between the contact face 82 (or bulge 84 portion thereof) and the shaft 28. In some examples, the SBP segments 102 can be in a shiplap configuration, whereby a plurality of individual SBP segments 102 (only one of which is shown) extend partially about the circumference of the shaft 28. The plurality of individual SBP segments 102 are lapped onto each other to form the full ring SBP 64". Lapping the plurality of SBP segments 102 allows the brush seal 48b to react to relative thermal and mechanical deflections and vibration in the shaft 28, thereby ensuring that the SBP 64" provides support to the first bristle set 70 throughout operation.

The brush seal 48b embodiment described above and shown in FIG. 7 may provide significant advantages. Each SBP segment 102, and thus the SBP 64", maintains contact with the second component 54' and slides on the first component 52 as seal cavity 50 expands and contracts. By expanding and contracting with the seal cavity 50, the SBP 64" minimizes any unsupported length of the first bristle set 70 within the seal cavity 50. The brush seal 48b also provides improved sealing. By minimizing the unsupported length of the first bristle set 70, the bristles in the first bristle set 70 can have a smaller diameter than would be possible otherwise, which provides improved flexibility and reduces any leakage through the first bristle set 70. Furthermore, the SBP 64 may prevent clash between the second component 54 and the brush seal 48b, as the SBP 64 slides in response to the seal cavity 50 expanding and contracting, thereby preventing contact between a hard stop and the second component 54'.

Figure 8A:
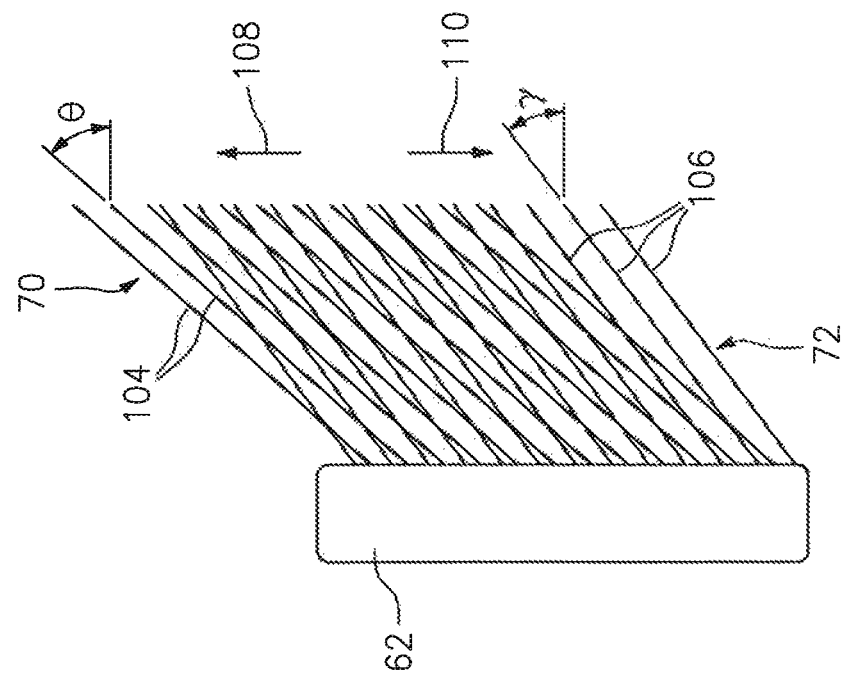
FIG. 8A is a top view of a first bristle set and a second bristle set.
Figure 8B:
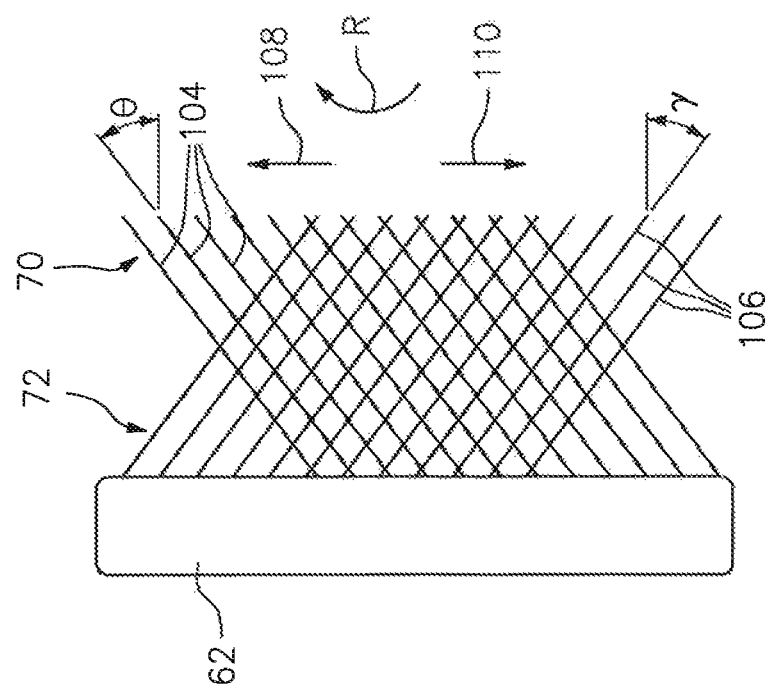
FIG. 8B is a top view of a first bristle set and a second bristle set.

FIG. 8A is a top view of the first bristle set 70 and the second bristle set 72 in a first relative orientation. FIG. 8B is a top view of the first bristle set 70 and the second bristle set 72 in a second relative orientation. FIGS. 8A and 8B will be discussed together. The first bristle set 70 includes first bristles 104 extending from the joint 62 at first lay angle $\theta$. The second bristle set 72 includes second bristles 106 extending from the joint 62 at second lay angle $\gamma$. The first bristle set 70 extends from a brush seal; such as brush seal 48a (shown in FIG. 2), brush seal 48a' (shown in FIG. 3), brush seal 48a" (shown in FIG. 4), brush seal 48a''' (shown in FIG. 5), brush seal 48a'''' (shown in FIG. 6), and brush seal 48b (shown in FIG. 7); and is configured to seal a seal cavity, such as seal cavity 50 (shown in FIGS. 2-7), to substantially impede or prevent air and other gases from leaking through the seal cavity. The second bristle set 72 extends from the brush seal and is configured to engage with and exert a force on a sliding backing plate, such as SBP 64 (best seen in FIG. 3), SBP 64' (shown in FIG. 6), and SBP 64" (shown in FIG. 7). To prevent entanglement, the first bristle set 70 can be angled relative to the second bristle set 72. Where first bristle set 70 contacts a rotating element, such as shaft 28 (best seen in FIG. 7), the first bristle set 70 is oriented in the direction of rotation of the rotating element (indicated by arrow R in FIG. 8A). The first bristles 104 and the second bristles 106 can be wire bristles and can be formed from a cobalt alloy or any other material that can withstand the high temperatures present in high pressure turbine section 40 (shown in FIG. 1) or any other section of gas turbine engine 10 (shown in FIG. 1) that the brush seal is disposed in during engine operation.

In FIG. 8A, the first bristle set 70 has a first lay angle oriented in first circumferential direction 108 and the second bristle set 72 has a second lay angle oriented in second circumferential direction 110. Angling the first bristle set 70 and the second bristle set 72 in opposite circumferential directions reduces entanglement between the first bristle set 70 and the second bristle set 72. In FIG. 8B, the first bristle set 70 is angled at first lay angle θ and extend in the first circumferential direction 108, and the second bristle set 72 is angled at second lay angle γ, different than first lay angle θ, and similarly extend in the first circumferential direction 108. Differing first lay angle θ and second lay angle γ prevents entanglement between the first bristle set 70 and the second bristle set 72. Reducing entanglement between the first bristle set 70 and the second bristle set 72 increases the lifespan of the bristles and thus of the brush seal.

Figure 9:
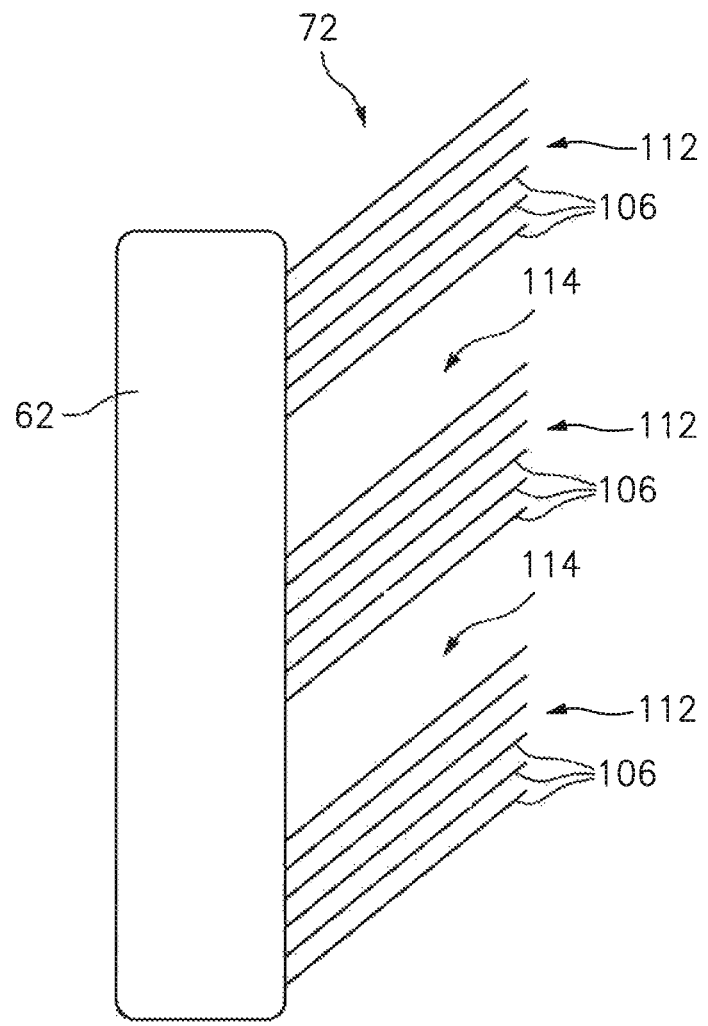
FIG. 9 is a top view of a second bristle set.

FIG. 9 is a top view of the second bristle set 72. The second bristle set 72 includes second bristles 106 extending from the joint 62. The second bristles 106 are disposed in bristle groups 112 with a gap 114 disposed between each bristle group 112. The gaps 114 extend circumferentially and provide space for the bristle groups 112 of the second bristle set 72 to compress towards the joint 62. For example, as a sliding backing plate; such as SBP 64 (best seen in FIG. 3), SBP 64' (shown in FIG. 6), and SBP 64" (shown in FIG. 7); contracts into a brush seal; such as brush seal 48a (shown in FIG. 2), brush seal 48a' (shown in FIG. 3), brush seal 48a" (shown in FIG. 4), brush seal 48a''' (shown in FIG. 5), brush seal 48a'''' (shown in FIG. 6) and brush seal 48b (shown in FIG. 7); each bristle group 112 displaces into the gaps 114. The gaps 114 allow each bristle group 112 to contract in response to the SBP being displaced by the active seal cavity, while preventing the second bristles 106 from expanding into the SBP or a first bristle set, such as first bristle set 70 (shown in FIGS. 2-7). As such, the gaps 114 prevent entanglement between the first bristle set 70 and the second bristle set 72. Reducing entanglement increases the lifespan of the bristles and thus of the brush seal. Moreover, the gaps 114 prevent wear to the second bristles 106 that could occur due to expansion into the SBP or the first bristle set 70, further increasing the lifespan of the second bristle set 72.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A brush seal comprising:
a top plate;
a back plate;
a bristle pack secured at a joint between the top plate and the back plate, the bristle pack comprising:
a first bristle set extending from the joint; and
a second bristle set extending from the joint to a distal end of the second bristle set; and
a sliding backing plate comprising:
a sliding portion disposed contiguous with the second bristle set, the sliding portion including a bristle-side face positioned contiguous with and facing a portion of the second bristle set located between the joint and the distal end; and
a support portion having an inner face and a support face, the inner face contacting the distal end of the second bristle set, and the support face configured to support at least a portion of the first bristle set;
wherein the sliding backing plate is configured to slide relative to the second bristle set.

2. The brush seal of claim 1, wherein the second bristle set is configured to exert a first pushing force on the inner face of the support portion to outwardly bias the sliding backing plate.

3. The brush seal of claim 2, further comprising a chamber defined at least in part by an inner face of the sliding portion and the second bristle set.

4. The brush seal of claim 3, further comprising a slide assist configured to exert a second pushing force on the inner face of the sliding portion to outwardly bias the sliding backing plate.

5. The brush seal of claim 4, wherein the slide assist comprises a spring disposed within the chamber.

6. The brush seal of claim 4, wherein the slide assist further comprises at least one fluid flow passage in flow communication with the chamber, the at least one fluid flow passage configured to provide a pressurized fluid passage to the chamber.

7. A seal compartment, comprising:
a first component;
a second component; and
a brush seal configured to provide a seal between the first component and the second component, and attached to the first component, the brush seal comprising:
a top plate;
a back plate;
a bristle pack secured at a joint between the top plate and the back plate, the bristle pack comprising:
a first bristle set extending from the joint; and
a second bristle set extending from the joint; and
a sliding backing plate comprising:
a sliding portion disposed between the second bristle set and the first component, the sliding portion including a bristle-side face positioned contiguous with and facing a portion of the second bristle set located between the joint and a distal end of the second bristle set; and
a support portion having an inner face and a support face, the inner face contacting the distal end of the second bristle set, and the support face configured to support at least a portion of the first bristle set;
wherein the sliding backing plate is configured to slide relative to the first component; and
wherein the second bristle set is configured to exert a first pushing force on the inner face of the support portion to outwardly bias the sliding backing plate toward the second component, and to maintain contact between the sliding backing plate and the second component.

8. The seal compartment of claim 7, further comprising a chamber defined by an inner face of the sliding portion, the second bristle set, and the first component.

9. The seal compartment of claim 8, the brush seal further comprising a slide assist configured to exert a second pushing force on the inner face of the sliding portion to outwardly bias the sliding backing plate toward the second component.

10. The seal compartment of claim 9, wherein the slide assist comprises a spring disposed within the chamber.

11. The seal compartment of claim 9, wherein the slide assist further comprises at least one fluid flow passage in flow communication with the chamber, the at least one fluid flow passage configured to provide a pressurized fluid passage to the chamber.

12. A gas turbine engine comprising:
a first engine component;
a second engine component;
a seal cavity extending between the first engine component and the second engine component; and
a brush seal secured to the first engine component within the seal cavity, the brush seal comprising;
a top plate;
a back plate;
a bristle pack secured at a joint between the top plate and the back plate, the bristle pack comprising:
a first bristle set extending from the joint; and
a second bristle set extending from the joint to a distal end of the second bristle set; and
a sliding backing plate comprising:
a sliding portion disposed between the second bristle set and the first component, the sliding portion including a bristle-side face positioned contiguous with and facing a portion of the second bristle set located between the joint and the distal end; and
a support portion having an inner face and a support face, the inner face contacting the distal end of the second bristle set, and the support face configured to support at least a portion of the first bristle set;
wherein the sliding backing plate is configured to slide relative to the first engine component.

13. The gas turbine engine of claim 12, wherein the second bristle set is configured to exert a first pushing force on the inner face of the support portion to outwardly bias the sliding backing plate toward the second engine component, and to maintain contact between the sliding backing plate and the second engine component.

14. The gas turbine engine of claim 12, further comprising a chamber within the seal cavity defined by an inner face of the sliding portion, the second bristle set, and the first engine component.

15. The gas turbine engine of claim 14, the brush seal further comprising a slide assist configured to exert a second pushing force on the inner face of the sliding portion to outwardly bias the sliding backing plate toward the second engine component.

16. The gas turbine engine of claim 15, wherein the brush seal further comprises at least one fluid flow passage in flow communication with the chamber, the at least one fluid flow passage configured to provide a pressurized fluid passage to the chamber.

17. The gas turbine engine of claim 12, wherein the first engine component is a non-rotating component and the second engine component is a non-rotating component.

18. The gas turbine engine of claim 12, wherein the first engine component is a non-rotating component and the second engine component is a rotating component.

* * * * *